United States Patent [19]

DePriester et al.

[11] 4,238,169
[45] Dec. 9, 1980

[54] HANDLING DEVICE FOR VEHICLE FRAMES

[75] Inventors: Donald J. DePriester, Niles; Richard C. Miller, Cassopolis, both of Mich.

[73] Assignee: Clark Equipment Company, Buchanan, Mich.

[21] Appl. No.: 904,130

[22] Filed: May 8, 1978

[51] Int. Cl.³ .................................. B65G 7/00
[52] U.S. Cl. .......................... 414/783; 294/86 R; 294/67 BA; 414/626
[58] Field of Search ............. 414/763, 419, 420, 421, 414/766, 151, 767, 619, 783, 620, 754, 911, 734, 626; 294/67 BA, 86 R, 86 LS, 88

[56] References Cited

U.S. PATENT DOCUMENTS

| | | | |
|---|---|---|---|
| 2,390,293 | 12/1945 | Colson | 294/86 LS X |
| 2,647,650 | 8/1953 | Sherriff | 414/620 |
| 3,696,487 | 10/1972 | Mrjgala et al. | 294/67 BA |
| 3,765,278 | 10/1973 | Fisher | 414/626 X |
| 3,905,495 | 9/1975 | Wayne | 414/783 X |
| 4,005,896 | 2/1977 | Ball et al. | 294/67 BA |
| 4,111,310 | 9/1978 | Stobb | 294/86 R X |

Primary Examiner—Frank E. Werner
Attorney, Agent, or Firm—J. C. Wiessler

[57] ABSTRACT

Apparatus for handling truck frames in production line assembly including a frame engaging and turning machine elevatable at a work station to a selected position for installation of components and parts at various stations of rotation of the frame which may then be lowered onto a pallet or the floor. The device for engaging and rotating such frames is of inverted U-shape having a fixed leg with an attached rotatable frame engaging pad, and an adjustable leg with an attached translatable frame engaging pad.

1 Claim, 4 Drawing Figures

HANDLING DEVICE FOR VEHICLE FRAMES

BACKGROUND OF THE INVENTION

Heretofore in the handling of truck frames, particularly industrial truck frames, during the manufacturing process a method has been employed utilizing chain falls by means of which the workman threads a chain through the truck frame and hooks up the threaded chain to a chain fall, lifts the frame by means of the chain fall, then partially rotates the frame, mounts selected components thereon, sets down the frame, unhooks and rehooks it, and lifts again the frame and rotates it until it is turned over. During the process the frame is often pulled over and dropped on the floor to speed up the operation.

Article handling means have been used heretofore in a different context, such as is disclosed in U.S. Pat. No. 2,678,025, in which a motor vehicle body carrier engages the body from the ends thereof during passage along a conveyor production line for automatically rotating the body about a longitudinal axes as the body passes certain sections of the assembly line for facilitating painting thereof, the body being automatically restrained from rotation along certain other portions of the assembly line. U.S. Pat. No. 2,959,444 discloses a tong-like device for engaging and rotating mill rolls operable from a crane and cable for elevating the mill roll which is engaged by pressure pads mounted in the tong operable to rotate the mill roll from a horizontal to a vertical position and vice versa. U.S. Pat. No. 3,915,311 discloses a specialized apparatus for handling large fragile objects by means of a donut shaped expansible collar located in a frame which surrounds the object, the annular frame having diametrically opposed support pads engageable to hold and rotate the annular frame to a desired position in a crane or block and tackle supported inverted U-shaped support frame.

It is an object of the present invention to provide an improved frame handling device for truck frames, and the like.

DETAILED DESCRIPTION

Figure 1:
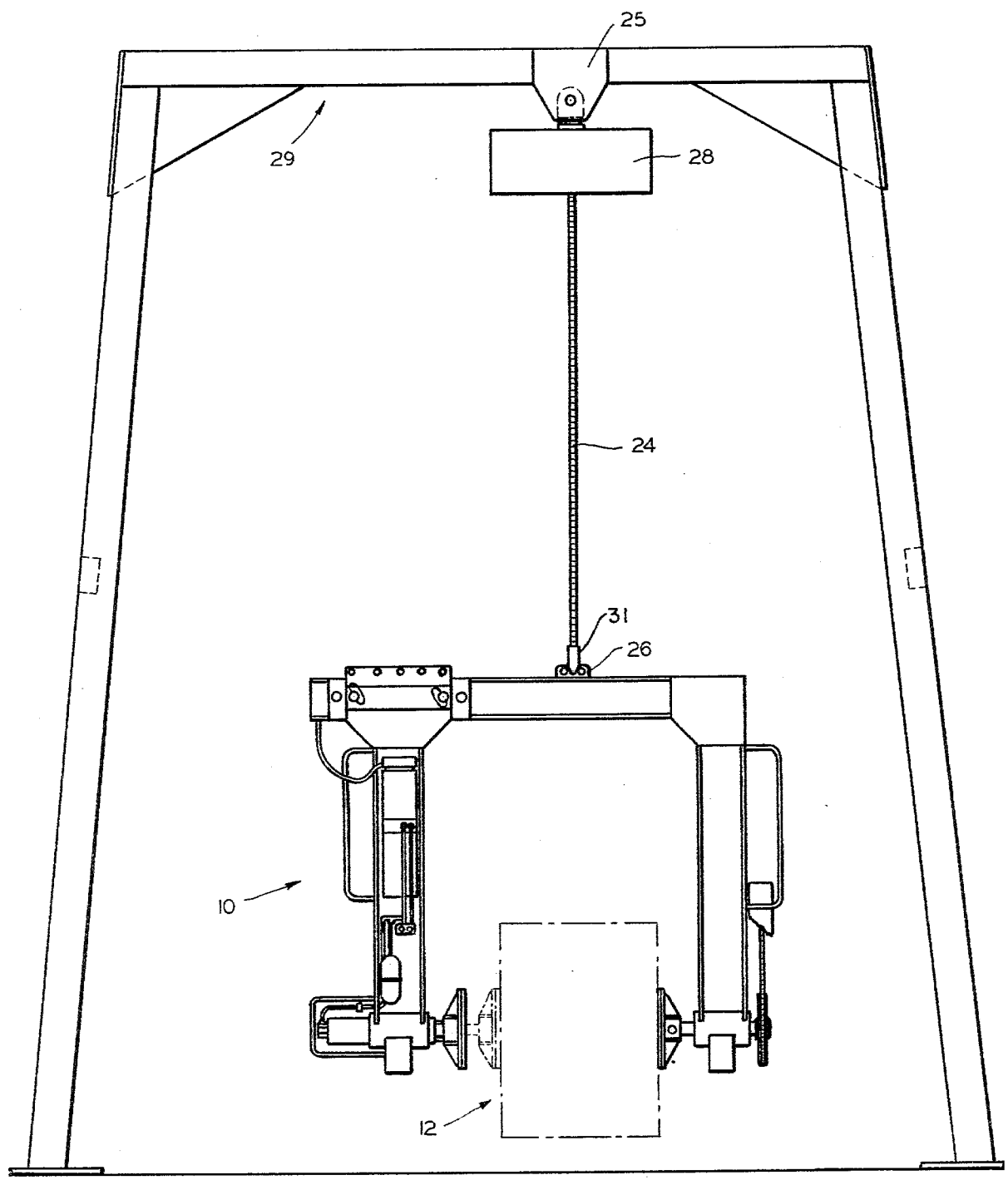
FIG. 1 is a front elevational view of our invention suspended from a bridge support assembly.
Figure 3:
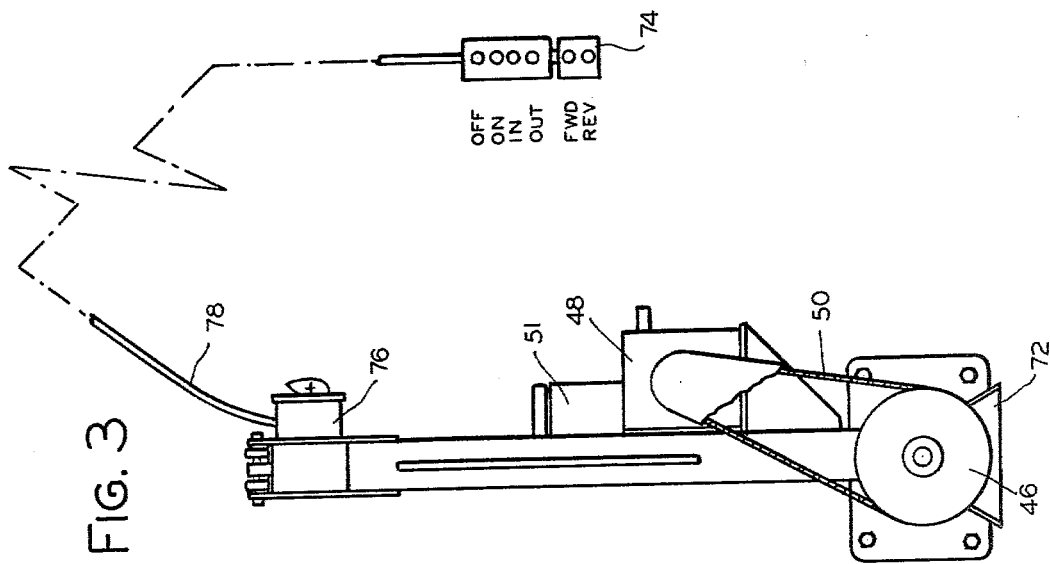
FIG. 3 is a side elevational view taken from the right hand side of FIG. 2 and shown connected in a diagrammatic manner to a control box.
Figure 2:
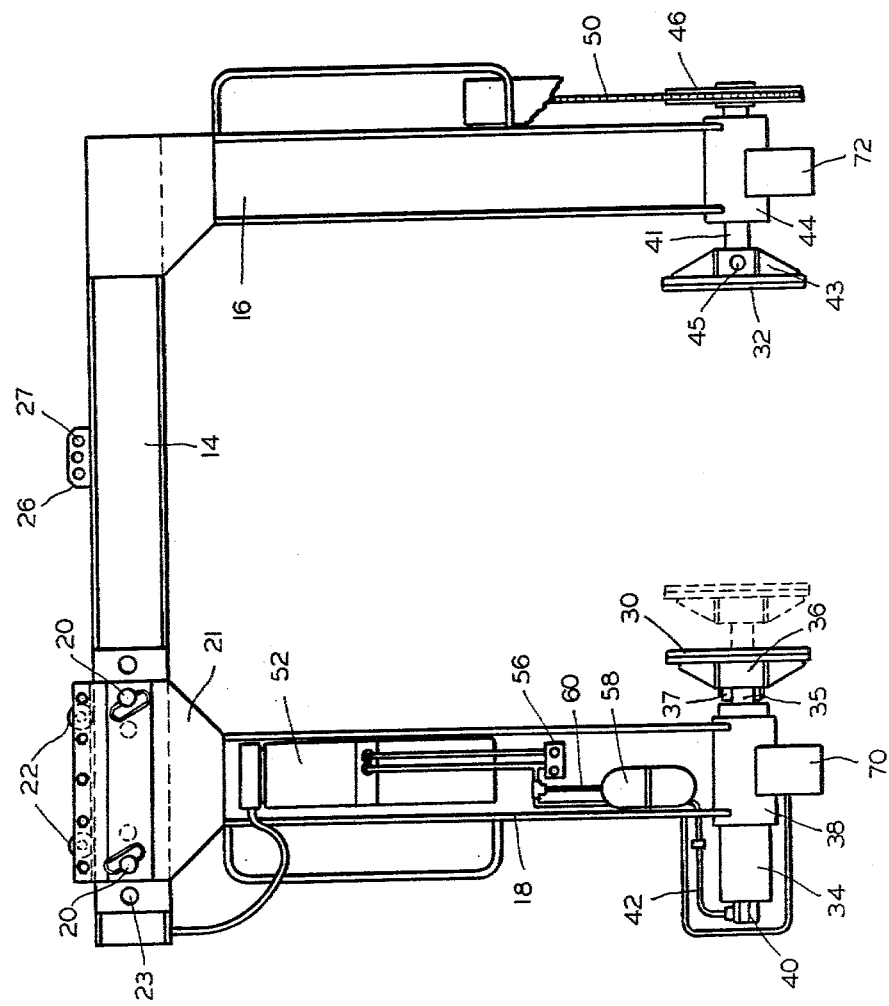
FIG. 2 is an enlarged view of the truck frame handling device shown in FIG. 1.

The frame handling apparatus 10 is designed particularly for handling fork lift truck frames, represented at 12, during the manufacturing process. It is of a generally inverted U-shaped configuration made up preferably of welded I-beams having a bridge portion 14, a fixed depending leg 16, and an adjustable depending leg 18. Leg 18 is adjustably secured to bridge 14 by a pair of removable pull pins 20 which permit the leg 18 to be adjusted along the I-beam comprising bridge portion 14 on rollers 22 of a supporting U-shaped bracket 21 which support the leg from the upper flange of the bridge. Pins 20 extend through the I-beam 14 and bracket 21, leg 18 being adjustable between three positions as represented by openings 23. A lifting block 26 on I-beam 14 has three position openings 27 which corresponds to the three positions of the adjustable leg so that the device is balanced when empty. When a load is lifted device 10 will tilt slightly until the center of gravity of the load is in line with the lift point. The opening width between the legs 16 and 18 may be thereby adjusted to compensate for variations in lift truck frame widths to be handled.

It should be noted that bracket 26 is offset to the right of center of the device along bridge 14 for permitting the device to be balanced when elevated by the chain fall inasmuch as the weight of the assembly of parts and components on the fixed leg is greater than the weight of the assembly on the movable leg. Device 10 is suspended from a chain fall 24 to lifting block 26 by a clevis 31, the chain fall being operable vertically by an electric motor 28 which is supported by a bracket 25 from the bridge portion of an A-frame assembly 29, shown in side elevation, which is adapted to span a selected area of an assembly line in which our device is used.

A lift truck frame is retained in the device by actuating a clamp pad 30 in any adjusted position of leg 18 into the side of the truck frame until it is pushed into abutment with a clamp pad 32. The clamping force is adequate to permit the device and lift truck frame within the range of sizes to be handled to be clamped in place, lifted and maneuvered by the chain fall or by a crane as may be required. A hydraulic cylinder 34, from the piston rod end 35 of which is suitably secured clamp pad 30 by a bracket and swivel pin 36, 37, is preferably mounted in tapered roller thrust bearings, not shown, in a bearing housing 38. Oil is supplied to the cylinder through a swivel elbow 40 which permits the cylinder to rotate while the oil supply line 42 remains fixed. Linearly movable pad 30 is free to swivel around the axis of pin 37 and linearly fixed pad 32 is connected to a drive shaft 41 by a bracket and swivel pin 43, 45, the swivel pin axes being displaced 90° such that the pads 30 and 32 together may swivel to adjust to variations in relation to the location of the truck frame so as to apply full clamping force thereto across the areas of the clamp pads.

Force for rotating the frame 12 to any selected position between the clamp pads is transmitted through drive shaft 41 which is mounted in thrust roller bearings (not shown) in a bearing housing 44. A drive sprocket 46 is mounted on the opposite end of the drive shaft and receives power from a double reduction worm gear drive 48 through a roller chain 50. Gear drive 48 is adapted to be powered by a reversible electric motor 51.

Figure 4:
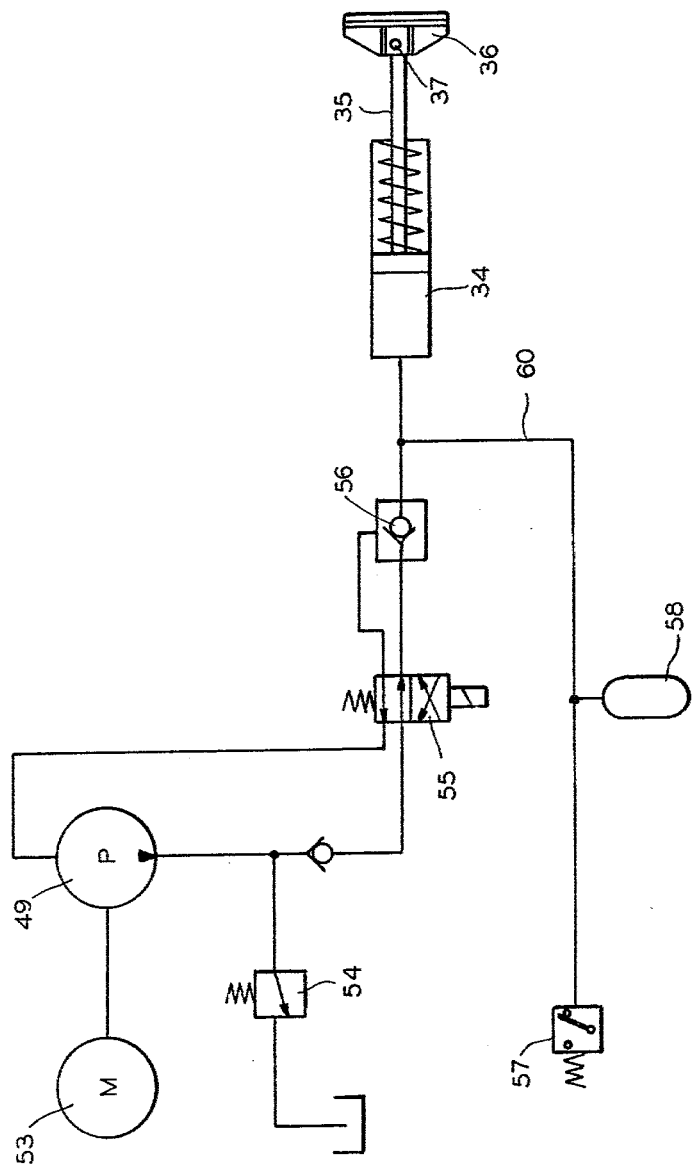
FIG. 4 is a schematic view of the control system for a portion of the device.

Hydraulic pressure to cylinder 34 is provided by a hydraulic power package 52 which includes a pump 49 (FIG. 4) having a relief valve 54 driven by an electric motor 53. Unit 52 contains a solenoid operated control valve 55 which controls hydraulic supply to the cylinder. The hydraulic line to the cylinder is routed through a pilot operated check valve 56 and is teed to an accumulator 58 by a line 60. When the cylinder 34 is pressurized, the pressure remains trapped between the check valve and the cylinder and will not bleed off until the solenoid operated control valve 55 is actuated to apply pressure to the pilot port on the check valve, thereby allowing the spring of the cylinder to return the piston of cylinder 34 to its retracted position.

A pressure switch 57 in the hydraulic power package monitors the pressure being applied to the cylinder and shuts off electric power to the pump motor when a predetermined pressure, such as 1000 psi, is reached. If the pressure should be reduced in the cylinder by leakage, the pressure switch will actuate, starting the pump to repressurize the cylinder. The accumulator serves to supply hydraulic oil under pressure to the cylinder in the event of oil leakage through the piston.

Support feet 70 and 72 are welded to the bottom of the device to provide a means for setting it on the floor when unhooked from chain fall 24.

A control box 74 having control push buttons as designated are adapted to actuate magnetic contactors in an electrical contactor box 76 which control electric power to the hydraulic pump motor and the worm gear drive motor of pads 30 and 32. Power supply and control wiring are routed to contactor box 76 from control box 74 on frame 29 through a multiple wire cable 78. As will be apparent from the legend on control box 74, the push buttons allow the operator to actuate cylinder 34 and to rotate shaft 41 so as to engage, lift, and locate rotationally a truck frame as desired. To engage a fork lift truck frame, the handling device is positioned along frame 29 so that the clamp pads are approximately centered on the sides of the frame. To clamp the frame the operator depresses the "In" button on the control box, which will remain detented. This actuates the pump to apply pressure to cylinder 34 until pressure in the cylinder reaches a predetermined level following clamping of the sides of the truck frame, at which time the pressure switch 57 actuates open shutting off the pump.

The operator may then operate the overhead crane to lift the handling device for rotating it in either direction by actuating the "Forward" or "Reverse" buttons on the control panel which must be held depressed to continue to rotate. When one of these push buttons is released the rotation will stop. With the frame rotated to any desired position the workman may install and assemble parts, and components of the vehicle as may be conveniently mounted in the frame at selected positions of rotation thereof. Subsequently the workman lowers the chain fall to position the frame on an assembly line dolly or on the floor. To release the frame the operator depresses the "Out" button on the control box which actuates the hydraulic pump, the solenoid valve 53 actuating to apply pressure to the pilot port of check valve 56 so that cylinder pressure is vented to the reservoir through the check valve and solenoid control valve, whereby the cylinder spring retracts the piston and clamp pad 30 and the overhead crane may be operated to lift the handling device clear of the frame.

It will be apparent to those skilled in the art that various changes in the structure and relative arrangement of parts may be made without necessarily departing from the scope of our invention.

We claim:

1. Vehicle frame handling apparatus adapted to be supported from an overhead crane or the like comprising an inverted U-shaped frame device having a fixed leg and a leg spaced from the fixed leg and adjustable in a direction lengthwise of the bridge of the U-frame, a pair of opposed clamp pads for clamping therebetween under the bridge of the frame device a vehicle frame, said clamp pads being supported from the lower end portions of respective ones of said legs, a piston motor for actuating one of said clamp pads outwardly of the supporting leg into the space between said legs, said piston motor having mounted thereon said one clamp pad, a second motor for rotating the other clamp pad, the cylinder of said piston motor being bearing mounted from one said leg for rotation with said one pad and with a vehicle frame during rotation of said other clamp pad, conduit means for conducting pressure fluid of said cylinder, swivel means mounting said conduit means to said cylinder so that the cylinder can rotate relative to said conduit means, said other clamp being mounted from the end of a drive shaft which is adapted to be rotated by said second motor, means pivotably securing said one clamp pad to the piston rod at a position angularly displaced from a location pivotably securing said other clamp pad to the drive shaft, and control means for first actuating said one pad into abutment with the vehicle frame to clamp the frame between the clamp pads for elevation with the U-frame and then actuate said other clamp pad in rotation which causes the vehicle frame and said one pad to rotate to a selected position.

* * * * *